United States Patent [19]

Yamashita

[11] 4,433,041
[45] Feb. 21, 1984

[54] RECORDING METHOD
[75] Inventor: Keitaro Yamashita, Saitama, Japan
[73] Assignee: Hitachi Metals, Ltd., Tokyo, Japan
[21] Appl. No.: 354,184
[22] Filed: Mar. 3, 1982
[30] Foreign Application Priority Data Mar. 4, 1981 [JP] Japan ................................. 56-30828
Mar. 4, 1981 [JP] Japan ................................. 56-30829

[51] Int. Cl.$^3$ ...................... G03G 13/14; G03G 13/22
[52] U.S. Cl. ...................................... 430/122; 430/31;
430/901; 118/657; 355/14 SH; 355/3 DD
[58] Field of Search .......................... 430/122, 31, 901;
118/657; 355/3 DD, 14 SH

[56] References Cited
U.S. PATENT DOCUMENTS 3,630,608 12/1971 Sage ....................................... 430/31
3,816,840 6/1974 Kotz ...................................... 430/122
3,926,628 12/1975 Honjo .................................... 430/901
3,982,938 9/1976 Honjo et al. ........................... 430/901
3,986,872 10/1976 Giaimo, Jr. ............................ 430/122
4,187,330 2/1980 Harada et al. ........................ 430/122

Primary Examiner—Edward C. Kimlin
Assistant Examiner—Merrell Cashion
Attorney, Agent, or Firm—Antonelli, Terry & Wands

[57] ABSTRACT

A recording method of forming a picture image directly on a recording sheet by a magnetic brushing process using a dry developing powder on the basis of an input picture signal not by forming an optical image directly on the recording sheet surface. The recording method comprising steps of disposing a transparent guide member against a nonmagnetic and conductive sleeve of a cylindrical shape which includes a permanent magnet member having a plurality of magnetic poles on its surface; so as to form a recording region applying a magnetic dry developing powder onto the sleeve, rotating the permanent magnet relative to the sleeve to form a magnetic brush at least in the recording region; passing a transparent recording sheet along the surface of the guide member so that the magnetic brush is brought near to or into contact with the recording sheet; and emitting a light signal based on a picture information signal to the guide member from its rear side to form a visible powder image on the surface of the recording sheet.

12 Claims, 2 Drawing Figures

RECORDING METHOD

BACKGROUND OF THE INVENTION

The present invention relates to a recording method for forming a visible image on a recording sheet by a magnetic brushing process using a dry developing powder, and, more particularly, to a recording method for forming a picture image directly on a recording sheet in response to an input signal rather than by forming an optical image directly on the recording sheet surface.

There are known method for electronic photographing, and electrostatic recording or electrostatic printing for duplicating documents or drawings. These duplicating methods employ inorganic photosensitive materials such as, for example, selenium, zinc oxide, cadmium sulfide, covered with an insulating film, or organic photosensitive materials such as, for example, polyvinylcarbazole, poly-N-vinyl-carbazole, and picture carriers such as, for example, a high resistance polyester sheet and an electrostatic recording paper formed of a low-resistance base on which a dielectric is formed. The surface of the carrier is uniformly charged with electricity and then exposed to light, or needle electrodes are brought into contact with the dielectric surface and supplied with a signal voltage to form an electric latent image. Then, a developing agent powder containing a magnetic substance is used to develop the latent image by a magnetic brushing process, and, subsequently, the image is fixed as, or fixed after the developing toner image is transferred onto a transfer sheet such as an ordinary paper, to form a final picture image. Duplicating methods of this type need a latent image forming means in addition to the developing means; therefore, the apparatus needed for duplication is very complicated and of a large-size.

Therefore, generally in a printer unit used as terminal equipment for computers and facsimile machines, a so-called direct recording method for reproducing characters, pictures, etc. has been proposed wherein the image is reproduced directly on the recording sheet as a visible image not by forming direct latent images. For example, in Japanese Patent Publication No. 30228/80 corresponding to U.S. Pat. No. 3,816,840, a dielectric recording member is disposed between a pair of electrodes, a conductive toner is deposited on the first electrode to form a conductive path between the electrode and the surface of the recording member, and then the toner is selectively deposited on the surface of the recording member in accordance with a potential signal applied between the electrodes. In, for example, U.S. Pat. Nos. 3,914,771 and 3,946,402, a conductive magnetic toner, retained on a cylindrical shell, is moved by the rotation of a magnetic roller within the shell, and electric pulses are applied to the electrode needles in synchronism with the rotation of the magnetic roller, in which recording method a toner applicator is used. Moreover, in the Japanese Patent Laid-open Application No. 127578/80, a permanent magnet is mounted on the needle electrode to establish a magnetic field at its tip end in an attempt to solve the problems encountered in the methods of the last-mentioned U.S. Patents.

In most of the conventional direct recording methods, a recording member is passed through a recording region formed between the recording electrode and an oppositely disposed electrode, with an electric field, based on a picture signal, being established between the electrode, or a magnetic field being superimposed upon the electric field so as to cause the magnetic toner, retained on the opposite electrode, to be selectively deposited on the recording member. A disadvantage of these proposed methods resides in the fact that, to obtain a high quality picture image, it is necessary to strictly specify various conditions such as, for example, the gap between the electrodes, the amount of toner, and an adjustment of the developing conditions in accordance with the environmental condition because, when an ordinary paper of volume resistivity of less than $10^{12}$ $\Omega$.cm is used as a recording paper, the surface resistance of the paper is greatly changed by environmental conditions such as humidity, temperature, etc. Additionally, with these conventional direct recording methods, a high recording rate is impossible.

SUMMARY OF THE INVENTION

It is an object of the present invention to provide a recording method which avoids, by simple means, disadvantages encountered in conventional methods thereby enabling, for example, an easy set-up of recording conditions, obtaining high-quality pictures independently of environmental conditions, and high-speed recording.

Another object of the present invention resides in providing a recording method capable of producing a high-quality negative, or an inverted picture image.

In accordance with the present invention, a recording method is proposed which comprises the steps of disposing a transparent guide member against a nonmagnetic and conductive sleeve of a cylindrical shape, with the sleeve including a permanent magnet member having a plurality of magnetic poles on its surface so as to form a recording region; applying a magnetic dry developing powder onto the sleeve; rotating the permanent magnet member relative to the cylindrical sleeve to form a magnetic brush at least in a recording region; passing a transparent recording sheet along the surface of the guide member so that the magnetic brush either approaches or is brought into contact with the recording sheet; and emitting a light signal, based on a picture information signal, to the guide member from a rear side to form a visible powder image on the surface of the recording sheet.

DESCRIPTION OF THE PREFERRED EMBODIMENTS

Figure 1:
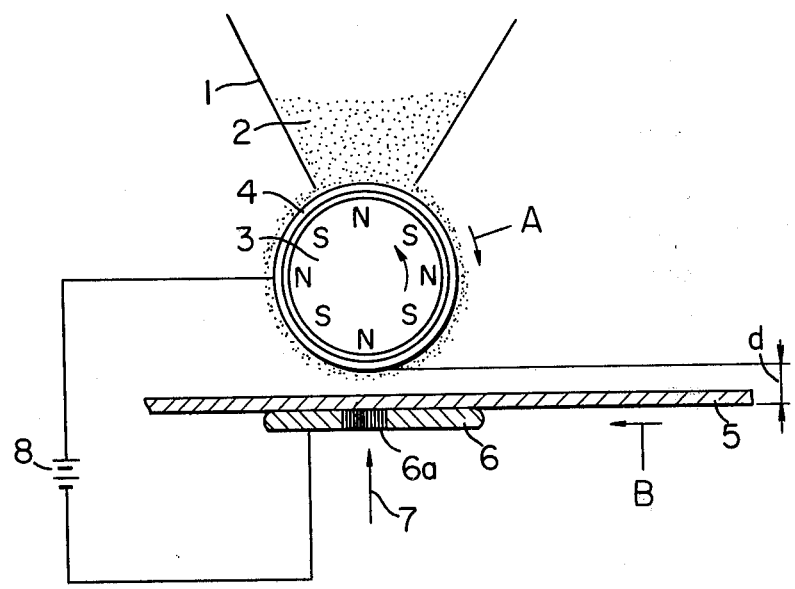
FIG. 1 is a schematic cross-sectional view of a recording portion for implementing the recording method in accordance with the present invention.

Referring now to the drawings wherein like reference numerals are used in both views to designate like parts and, more particularly, to FIG. 1, according to this figure, a magnetic toner 2 is placed in a hopper 1, under which a nonmagnetic and conductive sleeve 4 of a cylindrical shape is disposed. A permanent magnet 3 is provided in the sleeve 4, with the permanent magnet 3 including a plurality of magnetic poles disposed along an outer peripheral surface thereof. A guide member 6 is disposed below the sleeve 4 for supporting a recording paper 5 such as, for example, zinc oxide paper, static recording paper, normal paper, or the like, at a predetermined position relative to the sleeve 4. It is required that the guide member 6 be fashioned of a nonmagnetic, conductive material which is at least pervious to light. The guide member 6 may, for example, be a metal plate of aluminum, stainless steel, brass or the like, with slits 6a being provided therein. A light signal 7 of a laser beam or the like is fed from a rear side of the guide member 6, with a DC voltage source 8 being connected between the sleeve 4 and the guide member 6.

In accordance with the recording method of the present invention, the recording paper 5 is fed, in the direction of the arrow B, into a gap d formed between the outer peripheral surface of the sleeve 4 and the upper surface of the guide member 6. The gap d is preferably within a range of about 0.3 to 1 mm because a relatively strong electric field and a high precision of gap are necessary therebetween. The sleeve 4 and the permanent magnet 3 are rotated relative to one another and, for example, the sleeve 4 may be fixed with the permanent magnet 3 being rotated relative to the sleeve 4 in the direction of the arrow A, so that the magnetic toner can be carried in the direction of the arrow A. Thus, the toner 2 is brought near to or in contact with the surface of the recording paper 5, and, at the same time, a DC bias voltage is applied between the guide member 6 and the sleeve 4. The bias voltage is preferably selected to be within a range of 200 to 1200 V because the electric field established in the developing region is balanced with the magnetic force in dependence upon a resistance of the rear surface of the recording paper. At this time, when the light signal 7 is fed to the guide member 6 from the rear side thereof, the light signal 7 reaches the surface of the recording paper 5 through the guide member 6 and the recording paper 5. If the recording paper 5 is, for example, a photoconductive zinc oxide paper or the like, a conductive pattern is formed in response to the light signal 7 on the recording paper so as to cause an electrostatic force to be exerted on the magnetic toner 2 carried to the recording region, thereby resulting in the magnetic toner 2 being deposited on the surface of the recording paper 5 to form a normal or positive picture thereon. In this case, if the bias voltage is changed in value of polarity, an inverted or negative picture if formed. The volume resistivity of the toner 2 is within a range of $10^2$ to $10^{16}$ $\Omega$.cm, and preferably within a range of $10^4$ to $10^{12}$ $\Omega$.cm.

The developing agent is not limited to the magnetic toner, but may be a dual component system developer formed by a magnetic carrier such as, for example, iron powder, ferrite powder or the like and a nonmagnetic toner of a resin to which a pigment, dye of the like is added, or a photoconductive magnetic toner of, for example, a magnetic toner including zinc oxide, titanium oxide, selenium oxide or the like. It was confirmed that use of this photoconductive magnetic toner would provide a higher-fidelity recorded picture image, and also a sufficiently practical clear picture image can be obtained even on an ordinary paper.

Also, the bias voltage is not limited to a DC voltage as described above, but may be an AC bias voltage of about 300 to 2000 V at 100 Hz to 10 kHz under which a clear picture image can be obtained.

In accordance with the recording method of the present invention, a bias voltage is applied between the sleeve 4 and the guide member 6 so as to cause an electrostatic force to be exerted on the toner 2. Additionally, light is directed to shine into the recording region, thereby making the surface of the recording surface of the zinc oxide paper of the like conductive even though the surface is not pre-charged with electricity. Consequently, the bias voltage effectively acts on the toner 2 and causes electrostatic force to be exerted only on the portion of the paper upon which the light is directed so as to enable the toner 2 to be well deposited onto the surface of the recording paper 5.

In this case, since a relatively white paper such as zinc oxide paper, electrostatic recording paper or ordinary paper is considerably pervious to light, most of the light radiated to the paper from its rear side reaches the surface of the paper, making the surface of even the photoconductive recording paper uncharged or electrically conductive. The dispersion of the light signal 7 within the recording paper 5, upon passing through the paper 5, will lower the resolution under optical means such as a slit exposure used in the normal copying machine as a result of a dimming of the light from the light signal 7. If such optical means as a laser light of a fine beam is used, the problem of the light dispersion within the paper is almost non-existent, but a light signal with high resolution can be arrived at near the surface of the recording paper 5.

Figure 2:
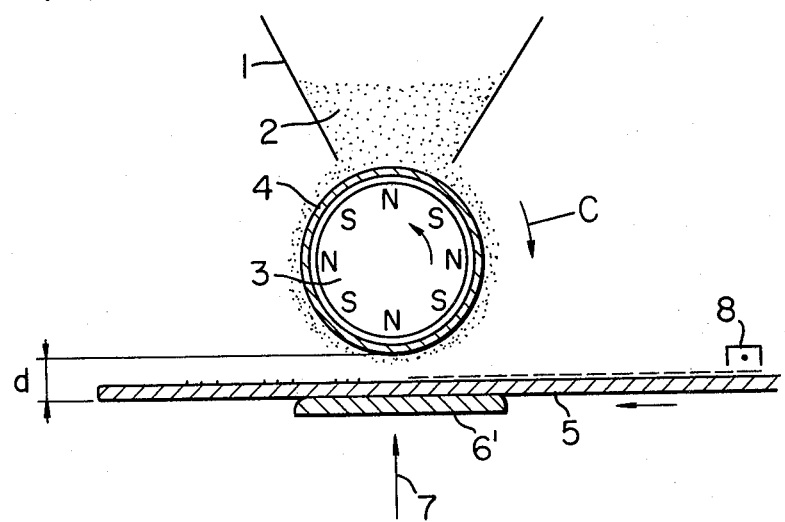
FIG. 2 is a schematic cross-sectional view of another example of a recording portion for implementing the recording method in accordance with the present invention.

As shown in FIG. 2, the magnetic toner 2 is placed in the hopper 1, below which is disposed the nonmagnetic sleeve 4, with the sleeve 4 being provided with the permanent magnet 3 having a plurality of magnetic poles on the outer peripheral surface thereof. A nonmagnetic guide member 6' is disposed beneath the nonmagnetic sleeve 4 for supporting the recording paper which is, for example, a zinc oxide paper with a photoconductive layer coated on its surface, at a predetermined position relative to the nonmagnetic sleeve 4. The guide member 6' may, for example, be a nonmagnetic metal plate with fine slits provided in a portion thereof to which light is directed or a plate of a material pervious to light such as, for example, NESA glass. The light signal 7 such as, for example, a laser beam or the like is directed toward the guide member 6' from the rear side thereof. A corotron 8 is provided to uniformly electrify the surface of the recording member.

In accordance with the recording method in FIG. 2, after the surface of the recording paper 5 is uniformly by the corotron 8, the recording paper 5 is fed into the gap d between the nonmagnetic sleeve and the guide member 6 in the direction of the arrow D. The nonmagnetic sleeve 4 and the permanent magnet 3 are rotated relative to one another, for example, the nonmagnetic sleeve 4 is fixed and the permanent magnet 3 is rotated in the direction of the arrow C to carry the magnetic toner 2 in the direction of the arrow C.

Thus, when the magnetic toner 2 is brought into contact with or brought close to the surface of the recording paper 5 and, at the same time the light signal 7 corresponding to the original picture, is fed to the guide member 6' from the rear side thereof, the light signal 7 reaches the surface of the recording paper 5, passing through the guide member 6' and the recording paper 5. Thus, the charge on the area of the surface of the recording paper 5 at which the light signal 7 is directed is discharged thereby resulting in the magnetic toner 2 being deposited on the areas other than the light area to which the light signal 7 is directed so as to form the so-called inverted or negative image. The toner resistivity of the magnetic toner 2, in this case, is within a range of volume resistivity of $10^2$ to $10^9$ $\Omega$.cm or, preferably, in the range of $10^2$ to $10^4$ $\Omega$.cm.

In the recording method of the present invention, the recording paper 5 has its surface uniformly electrified beforehand, and the light signal 7 is fed to the recording paper 5 from the rear surface to form a latent image in the recording region. This is because the light signal 7 is incident to a relatively white paper such as, for example, a zinc oxide paper considerably pervious to light, from its rear side and most of the incident light reaches the surface of the recording paper 5. The dispersion of the light signal 7 within the recording paper 5 upon passing through the recording paper 5 will sometimes lower the resolution under optical means such as a slit exposure used in a normal copy machine as a result of dimming of the light. If such optical means as a laser light of fine beam is used, the problem of the light dispersion within the recording paper 5 is almost non-existent, but a light signal 7 with high resolution can be arrived at near the surface of the recording paper 5.

EXAMPLE 1

In FIG. 1, the recording paper 5 used was a zinc oxide paper of about 80 μm thickness and the magnetic toner 2 used had an average grain diameter of 20 μm, a volume resistivity of $10^{10}$ Ω.cm, 50% wt. of magnetic powder such as, for example, magnetite of a grain diameter of 0.5 μm. By using the above recording paper 5 and toner 2, the following experiment was performed. The sleeve 4 was made of aluminum and had an outer diameter of 32 mm, and the permanent magnet 3 was a ferrite magnet with 8 symmetrical poles and established a magnetic flux density of 800 gauss on the sleeve 4. Only the permanent magnet 3 was rotated at 800 r.p.m. to form a magnetic toner layer having a thickness of about 1 mm on the sleeve 4. Then the recording paper 5 was moved at 200 mm/sec while its surface was in light contact with the surface of the magnetic toner layer and, at the same time, a semiconductor laser beam, having a spot diameter of 0.05 mm, as a light signal 7 was fed to the recording paper 5 from its rear side. At this time, a positive picture of good resulution, 8 lines/mm was obtained. In this case, a DC voltage of 1200 V was applied between the sleeve 4 and the guide member 6, and the gap d was 0.9 mm.

EXAMPLE 2

In FIG. 1, the recording paper 5 used was a normal paper having a thickness of 75μm and a volume resistivity of $10^{11}$Ω.cm, and the magnetic toner used had an average grain diameter of 20 m with a volume resistivity of $10^{14}$Ω.cm, and a magnetic powder of magnetite of grain diameter 0.5 Ωm of 50% by wt. and photoconductive particles of zinc oxide of an average grain diameter of 0.5 μm of 15% by wt. The other conditions were the same as in Example 1. The result of this experiment was that a clear image was obtained with a resolution of 6.3 lines/mm. Moreover, in this experiment, under the application of a bias voltage of 600 V at 4 kHz, likewise a clear picture image was obtained at a temperature of 30° C. and humidity of 80% ReH.

In the normal copying machine, the feeding speed of the recording paper 5 is about 500 to 100 mm/sec, while, in the examples described hereinabove and below, the feeding speed was as high as 200 mm/sec under which a clear picture was obtained.

EXAMPLE 3

In FIG. 2, a zinc oxide paper having a thickness of about 80 μm was used as the recording paper, and its surface was uniformly charged to −500 V by the corotron 8. Then the recording paper 5 was fed, at a speed of 200 mm/sec, to the recording portion. A sleeve 4 made of aluminum, with an outer diameter of 32 mm was used as the nonmagnetic sleeve 4, and a ferrite magnet having 8 symmetrical poles was used as the permanent magnet 3, establishing a magnetic density of 800 gaus on the sleeve 4. Only the permanent magnet 3 was rotated at a speed of 800 r.p.m., with the magnetic toner 2 of an average grain diameter of 20 m and volume resistivity of $10^3$ Ω.cm forming a layer having a thickness of about 1 mm on the sleeve 4 and the gap d was set a 0.9 mm, while the sleeve 4 was brought into contact with the surface of the recording paper 5. At the same time, when a semiconductor laser beam of a spot diameter of 0.05 mm was emitted as the light signal 7 corresponding to the original picture, to the recording paper 5 from its rear side, a good negative picture having a resolution of 8 lines/mm was obtained. In the normal copying machine, the feeding speed of the recording paper 5 is about 50 to 100 mm/sec, while, in this example, the feeding speed was as high as 200 mm/sec under which a good negative picture image was obtained.

The volume resistivity of the toner 2 used in the method of the present invention was measured by applying a DC filed of 100 V/cm under the condition that the toner 2 was filled in a cylinder made of Teflon, with the cylinder having an inner diameter of about 3.05 mmθ, a thickness of about 1 to 2 mm, and with a load of about 200 gr. applied thereto.

Thus, according to the recording method of the present invention, a clear picture can be recorded directly on the recording paper 5 which moves at a high feeding speed through a simple mechanism.

I claim:

1. A recording method comprising the steps of:
   disposing a guide member at least a portion of which is transparent against a nonmagnetic and conductive sleeve of a cylindrical shape which is provided therein with a permanent magnet member having a plurality of magnetic poles on its surface, thereby forming a recording region between said guide member and said sleeve;
   supplying a dry developing powder having a magnetic property on said sleeve;
   rotating said permanent magnet member relative to said sleeve to form a magnetic brush at least in said recording region;
   passing a recording sheet paper at least a rear surface of which opposing said guide member is transparent along a front surface of said guide member in opposition to said sleeve to make a front surface of said recording sheet paper to be brought near to or in contact with said magnetic brush;
   emitting a light signal corresponding to a picture information signal to said recording region at least from a rear side of said guide member, whereby an electric charge pattern positively or negatively corresponding to said picture information signal is formed on the front surface of said recording sheet paper and at the same time said dry developing powder or said magnetic brush is deposited on said electric charge pattern to form a picture image of powder on the front surface of said recording sheet paper.

2. A recording method according to claim 1, wherein before the recording sheet is passed through the recording region, the front surface of the recording sheet is paper uniformly charged with electricity in order to form an inverted picture image opposite to the original picture.

3. A recording method according to claim 2, wherein the recording sheet paper is a zinc oxide photosensitive paper and the developing powder is a single-component magnetic toner of a volume resistivity in the range from $10^2$ to $10^9$ $\Omega$.cm.

4. A recording method according to claim 1, wherein the guide member is formed of a conductive material, and a DC bias voltage is applied to the guide member when the recording sheet paper is passed through the recording region.

5. A recording method according to claim 4, wherein the developing powder is a single-component magnetic toner of a volume resistivity in the range from $10^2$ to $10^{12}$ $\Omega$.cm.

6. A recording method comprising the steps of:
disposing a transparent guide member against a nonmagnetic and conductive sleeve of a cylindrical shape which is provided therein with a permanent magnet member having a plurality of magnetic poles on its surface, thereby forming a recording region;
supplying a dry developing powder having a magnetic property on said sleeve;
rotating said permanent magnet member relative to said sleeve to form a magnetic brush at least in said recording region;
passing a transparent recording sheet along the surface of said guide member to make it close to or in contact with said magnetic brush;
emitting a light signal corresponding to a picture information signal to said guide member from its rear side to form a picture image of powder on the surface of said recording sheet, wherein the guide member is formed of a conductive material, and a DC bias voltage is applied to the guide member when the recording sheet is passed through the recording region the developing powder is a single-component magnetic toner containing a photoconductive substance and has a volume resistivity in the range of from $10^2$–$10^{12}$ $\Omega$.cm, and the recording sheet is an ordinary paper of a volume resistivity less than $10^{12}$ $\Omega$.cm.

7. A recording method according to claim 1, wherein the light signal is a light beam of a spot diameter less than 0.1 mm.

8. A recording method comprising the steps of:
disposing a guide member at least a portion of which is transparent against a nonmagnetic and conductive sleeve which is provided therein with a permanent magent member having a plurality of magnetic poles on its surface, thereby forming a recording region between said guide member and said sleeve;
supplying a dry developing powder having a magnetic property on said sleeve;
rotating said permanent magnetic member relative to said sleeve to form a magnetic brush at least in said recording region;
passing a recording sheet paper at least a rear surface of which opposing said guide member is transparent along a front surface of said guide member in opposition to said sleeve to make a front surface of said recording sheet be brought near to or in contact with said magnetic brush;
emitting a light signal corresponding to a picture information signal to said recording region at least from a rear side of said guide member to form a picture image of powder on the front surface of said recording sheet, said developing powder is a single component magnetic toner containing a photoconductive substance and the recording sheet is an ordinary paper of a volume resistivity of less than $10^{12}$ $\Omega$.cm.

9. A recording method according to claim 8, wherein before the recording sheet is passed through the recording region, the front surface of the recording sheet paper is uniformaly charged with electricity in order to form an inverted picture image opposite to the original picture.

10. A recording method according to claim 9, wherein the recording sheet paper is a zinc oxide photosensitive paper and the developing powder is a single-component magnetic toner of a volume resistivity in the range from $10^2$ to $10^9$ $\Omega$.cm.

11. A recording method according to claim 8, wherein the developing powder is a single-component magnetic toner of a volume resistivity in the range from $10^2$ to $10^{12}$ $\Omega$.cm.

12. A recording method according to claim 8, wherein the light signal is a light beam of a spot diameter less than 0.1 mm.

* * * * *